March 5, 1968     N. E. LAMB     3,371,432

VISUAL SIMULATION

Filed Oct. 11, 1966

Inventor
Noel Edward Lamb

By
Watson, Cole, Grindle & Watson
Attorneys

United States Patent Office 3,371,432
Patented Mar. 5, 1968

3,371,432
VISUAL SIMULATION
Noel Edward Lamb, 4 Falcon Close, Shoreham-by-Sea, Sussex, England
Filed Oct. 11, 1966, Ser. No. 585,951
Claims priority, application Great Britain, Oct. 11, 1965, 43,105/65
10 Claims. (Cl. 35—12)

This invention relates to visual simulation equipment. Simulation equipment in this context is used to give a person under training, e.g. a pilot of an aircraft, practice in performing manoeuvres, actions and evolutions in a synthetic environment which is none the less as closely as possible typical of the real environment of which he will be required to operate.

In a number of simulators the scene as seen from a control cabin or cockpit is of vital importance to the person under training in forming judgements on which to base his reactions. Examples of such simulators would be a space vehicle, an aircraft, a helicopter, a ship, a road or cross-country vehicle.

Taking aircraft simulation as an example, in most cases where visual simulation is needed the pilot is judging the approach of his aircraft to an aerodrome or the flight of his aircraft low over the ground and in so doing he makes use not only of the point in space on which his eyes are focused but also of the "peripheral vision" which in a fit man extends to an included angle of over 200°.

The simulated vision system should therefore approach as closely as possible the real environment since much of the effectiveness of simulated training is lost if the simulated environment is unrealistic. With good simulation the pilot rapidly forgets that he is in a synthetic device and believes that he is engaged on a real task.

The following ideal requirements therefore exist for a simulated vision system:

(1) Definition, i.e. depth of focus, throughout the whole field of vision from the nearest point that the pilot might expect to see the ground to the horizon.

(2) Peripheral vision, preferably approaching an included angle of 200° but certainly no less than 140°. It should be noted that in certain applications, i.e. when the pilot's field of vision is not limited arbitrarily by the structure of the cockpit in which he is sitting, his peripheral vision will extend in the vertical plane as well as the horizontal.

(3) The illusion of perspective. For this to be realistic the eye of the observer must occupy the perspective centre of the simulated vision system thereby avoiding apparent parallax.

Basically a simulated vision system consists of a means of projecting on to a screen which can be seen by the pilot, an image of a land (or sea) scape. The image may be derived from a model and is fed to the projection system via a suitable device, normally including some means of amplification; although in some systems the intensity of the image is sufficient to produce a satisfactory picture without modification.

With the above objects in view, the invention provides visual simulation equipment comprising light transmission means having a receiving end and a projection end; input means located adjacent said receiving end to receive light from a model to guide light from the model to said receiving end, said input means comprising a concave mirror to be directed at the model and a convex mirror arranged to receive light from said concave mirror and reflect this light to said receiving end; and display means optically similar to said input means and disposed to utilize light from said projection end to produce a picture of the model, said display means including a concave screen and a convex mirror located to reflect light projected from said projection end onto said concave screen on which the picture is produced.

The concave mirror and screen are preferably part spherical, with the receiving and projection ends of the light transmission system aligned with the respective convex mirrors on respective radii of the respective spheres.

For normal aircraft simulators a quarter-sphere may be used for the concave mirror and the concave screen, but larger segments may sometimes be desirable, for example in helicopter simulation, up to half a sphere.

In order that the invention may be better understood and to show how it may be carried into effect, reference will now be made to the accompanying schematic drawings in which.

Figure 1:
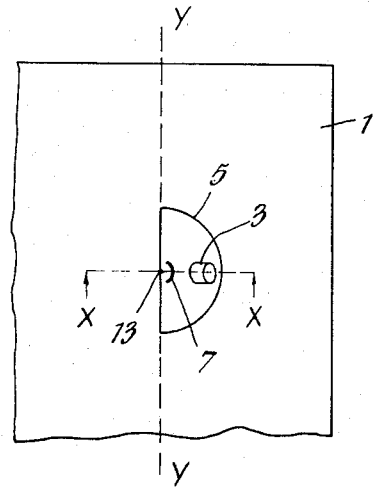
FIGURE 1 shows the input arrangement of an embodiment of the invention mounted for movement over a model.

Before referring in detail to the figures the main features of a complete visual simulation system of the invention will be outlined. As an example, aircraft simulation will be referred to.

(1) A model which is representative of a real or imaginary terrain. The representation may be realistic or stylised and may be flat or executed in relief by any one of a number of means of contour realisation. The important thing is that the model shall be such as to present to the pilot an interpretable image of a landscape.

(2) An optical arrangement, having input and display parts, which is to place an image acceptance centre in the same relation to the scale model as the pilot would be in relation to real terrain. Therefore, for example, when the aircraft would be on the ground the pilot's eye might be about 20 feet above the ground and the optical arrangement must be such as to place the acceptance centre a scale distance of 20 feet above the model runway.

(3) A light transmission system, such as a television link, and comprising:

(a) A television camera connected on to the input part of the optical arrangement. The television camera may be of any type whose characteristics are suitable for vision simulation. The camera itself is permitted to range over the model, or alternatively the model is permitted to move under the camera in such a way that it reproduces, to scale, the apparent movements of the aircraft over the ground. It should be noted that in different configurations the model may be placed in a different relationship to the camera, e.g. the model above the camera, although in the subsequently described configuration the model is considered as underneath the camera;

(b) A projection system compatible with the camera and mounted in a relationship depicted in the detailed description with a screen system. The invention may be practiced with relatively conventional projectors having a normal angle of emission, comparable with the angle of acceptance of the camera system when divorced from the input part of the optical arrangement. The television projector, which may be a multiple head projector for colour working, is mounted in such a way that it does not obstruct the field of view of the pilot. The input part of the optical arrangement mentioned under point (2)

above has a concave mirror, preferably spherical, which gathers light from the model and a convex mirror, also preferably spherical, which receives the gathered light and reflects it to the television camera lens.

The display part of the optical arrangement mentioned under point (2) above has a screen which is shaped as the inside of a segment of a sphere (assuming the concave input lens is spherical), being for full peripheral vision both horizontal and vertical, a hemisphere, but being in more restricted applicaions less than a hemisphere. The screen is mounted such that the pilot is as close to the centre of the sphere formed by the screen as possible. This ensures that he is at the centre of perspective and that the illusion of depth is best created. A convex (part spherical) mirror is placed in such a way that the image from the television projector is displayed upon the screen with minimum distortion. The optical similarity of the input and display parts of the optical arrangement ensure that distortion is kept to a minimum.

Figure 2:
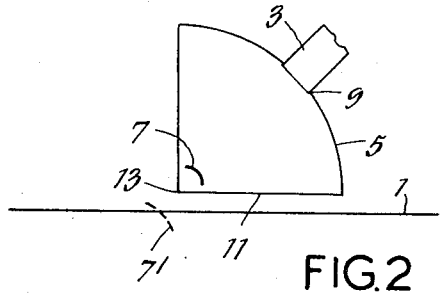
FIGURE 2 is a vertical section on the line X—X in FIGURE 1 on an enlarged scale.
Figure 3:
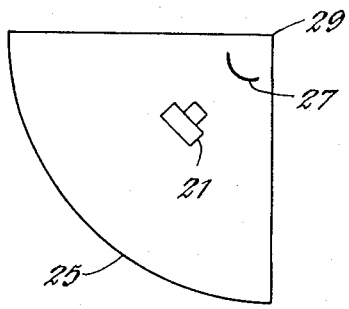
FIGURE 3 is a vertical section through the output arrangement of the embodiment of FIGURE 1.

Turning now to the drawings, the visual simulation system now to be described with reference to FIGURES 1 to 3 is for use in simulating the movement of an aircraft or other vehicle at or near ground level. The movement is carried out over a relief model and is under the control of an observer in a simulator who has a picture of the relief model displayed before him. A television link is used to transmit the view of the model to the simulator.

Referring now to FIGURES 1 and 2, the relief model is constructed on a base 1 which represents the ground, no features of the landscape being shown in the drawing. A television camera 3, of which only the lens turret is shown diagrammatically, is supported, by means not shown, for tracking over the model under the control of the observer and "sees" the view from the simulated aircraft or vehicle in which the observer is sitting. Mounted at the end of the lens turret of the camera 3 are two input mirrors 5 and 7 (details of their mounting are not shown). The mirror 5 is a concave mirror of quarter-spherical shape and having a central aperture 9 for receiving the lens turret of the camera 3. The mirror 5 is mounted with one edge 11 parallel and near to the ground so that light from the model—to the left of line Y—Y in FIGURE 1—can impinge upon the mirror. The mirror 7 is a convex mirror also of spherical form and mounted facing the concave mirror 5, the mirror 7 and the lens turret being aligned on the radial line from the centre 13 of the sphere of which the mirror 5 defines a portion to the centre of the aperture 9, that is at 45° to the base 1 of the model. The radius of the convex mirror is dependent on the lenses in the lens turret. Both mirrors are made by coating an appropriately shaped glass or metal body with a highly reflective layer.

Light from the relief model is reflected by the concave mirror 5 to the convex mirror 7 and thence to the lens turret of the television camera 3 which receives the light and converts it into an electrical signal for transmission over the aforementioned television link to provide a display of the view of the model seen by camera 3 with the aid of the mirrors 5 and 7. The provision of the display will now be described with reference to FIGURE 3. The electrical signal from the camera 3 is received by a television projection receiver 21 which is mounted within the segment defined by a quarter-spherical, concave screen 25, the receiver 21 facing away from the screen and being directed at a convex mirror 27 located near the centre 29 of sphere of which the screen is a portion. The convex mirror is also of spherical form and is aligned with the receiver 21 on the radial line from the point 29 through centre of the screen.

The light produced by the receiver 21 is projected by a lens arrangement onto the mirror 27 and thence onto the screen 25 to provide a display of the relief model for the observer who is preferably seated to watch the screen 25 with his eyes near the point 29. In this position, the observer gets the most realistic impression in accordance with point (3) above. To provide realistic simulation the screen is preferably about ten feet in diameter. The concave mirror 5 used on the relief model may be about 6 inches in diameter.

The optical similarity of the input concave mirror and convex mirror to the display convex mirror and concave screen is clearly shown in FIGURES 2 and 3 and this similarity results in distortions arising in the input mirrors being at least partially cancelled out by the display arrangement.

The angle of view in azimuth provided by the described system depends on the relative positions of the input mirrors and of the display convex mirror and the screen. The angle of view can be widened—that is made to more nearly approach 180° as represented by the line Y—Y in FIGURE 1—by placing the convex mirror 7 at a relative position 7' a little beyond the centre point 13 on an extension of the aforementioned radial lines through this point. The convex mirror 27 would similarly be moved outside the quarter-spherical segment defined by the screen 25 to a position a little beyond point 29. However, the position of the mirrors 7 and 27 actually shown in FIGURES 1 to 3 is preferred for simulation at or near ground level as shown in these figures, the explanation for this being as follows. A typical scale factor for the simulation model is 1:2000. If the perspective centre of simulation is the point 13 in FIGURE 2 and the convex mirror is placed at 7', the lower edge 11 could not be brought down to less than say 1 inch above the base 1 of the model. This would represent a minimum simulated height of 167 feet above ground. Therefore, it is clearly advantageous to mount the convex mirror 7 within the concave mirror 5, as shown, to enable the lower edge 11 of the mirror to be brought down to ground level.

A further embodiment of the invention will now be described with reference to FIGURE 4, this embodiment allowing a full field of view of 360° in azimuth as is desirable in simulating the flight of a helicopter.

Figure 4:
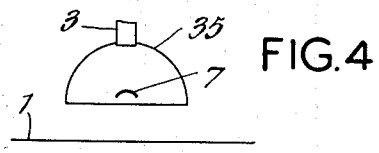
FIGURE 4 shows a vertical section through the input arrangement of a further embodiment of FIGURE 1.

In FIGURE 4, the base of the model of the ground over which the simulated helicopter is flying is again designated 1 and the input optical system is similar to that described above with a spherical concave mirror 35, a spherical convex mirror 7 and television camera 3. In this case the concave mirror is hemispherical with the open side of the hemisphere towards the ground. The mirror 7 and the lens turret of the camera are mounted on a vertical axis through the centre of the concave mirror, the camera being directed vertically downwards through a central aperture in the concave mirror onto the convex mirror. Thus a view of the ground from above will be obtained through an angle of 360° in azimuth since the arrangement is symmetrical about the vertical axis. On the output side, the projection and display will mirror the input arrangement shown in FIGURE 4, with a hemispherical, concave screen mounted open side upwards and a projection receiver and a further convex mirror mounted to project a display of the model onto the screen in a similar manner to that shown in FIGURE 3. The observer is positioned at the centre of the sphere of which the screen is a half portion so that the ground is displayed beneath his feet.

The system shown in FIGURES 1 to 3 can also be adapted for use in simulating aircraft flight above ground since the concave mirror 5 is capable of receiving light in a vertical plane from the horizontal to vertically downwards thus giving a forward view of the ground over which the simulated aircraft is flying. In such a system the screen 25 could be made as a hemisphere having its open side vertical, the lower half of the screen being used for the ground display and the upper half having sky and clouds projected onto it to complete the forward view from the aircraft.

Figure 5:
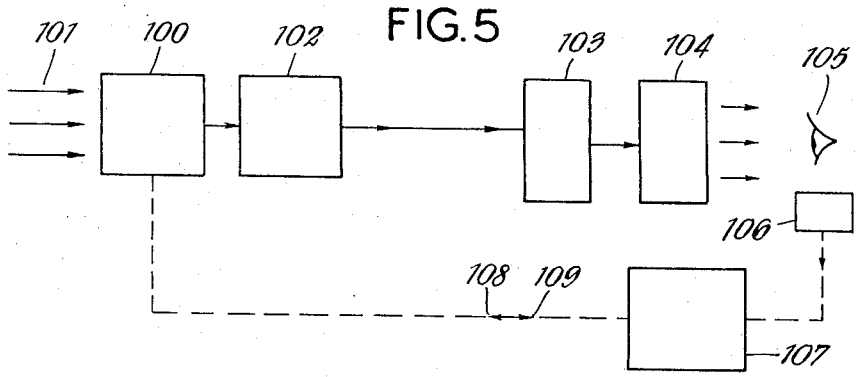
FIGURE 5 is a simplified block diagram of a simulation system.

The description so far has related to the visual side of the simulation; the control and response systems of simulators are well known in the art and it is not felt necessary to describe such a system in detail. FIGURE 5 shows the whole simulator in block form illustrating the relationship of the visual apparatus as previously described to the remainder of the simulator. In FIGURE 5, the visual apparatus comprises the input lens 100 receiving light 101 from a model and passing it to the television camera 102 which transmits the corresponding electrical signals to the projector 103 which in turn transmits the reconstituted light to the display means 104 the screen of which is watched by the trainee 105 in the simulator.

The trainee responds to what he sees and the various control means at his disposal are represented by the block denoted 106. The control means supply signals to a computer 107 which computes the results of the trainee's actions and supplies signals 108 to move the television camera 102 with the input lens 100 over the model. The computer will, of course, also take into account data received from the model (signals 109) where, for example, a ground vehicle is being simulated and conditions regarding the terrain have to be accounted for, there being a terrain responsive probe moved with the camera in this case. The computer also provides other data to the trainee regarding the simulated environment.

In the foregoing description the light transmission means has been described as a television link. However, another system such as a modulated laser beam is envisaged as an alternative to the television link.

It is to be understood that the term "spherical" as used herein for the mirrors and screen is used in its usual optical sense—as for example in "spherical lenses"—to mean that the operative surface of the mirror or screen is at least a part of a spherical surface. Thus, as described heretofore, the concave mirror of the input lens may be a quarter- or hemi-spherical surface. The convex mirrors, though shown as parts of spherical surfaces, may in fact be completely spherical though it will be realised that in this case only part of the total mirror area is utilized in reflecting light in the manner described.

The mirrors have been described as having a reflective coating formed on an appropriately shaped glass or metal body but the mirrors, provided they have the desired shape, may be manufactured in other ways which will be apparent to those skilled in the art.

Although I have found it more convenient to use a spherical mirror and screen, the invention may be practised with mirrors and screen deviating from sphericity provided that the aforementioned requirement of optical similarity between the input and display parts of the optical arrangement is maintained.

It will also be realised by those skilled in the simulator art that the scale factor of the simulator model may vary widely and that the physical dimensions of the optical arrangements may be modified accordingly.

What I claim is:

1. Visual simulation equipment comprising light transmission means having a receiving end and a projection end; input means located adjacent said receiving end to receive light from a model to guide light from the model to said receiving end, said input means comprising a concave mirror to be directed at the model and a convex mirror arranged to receive light from said concave mirror and reflect this light to said receiving end; and display means optically similar to said input means and disposed to utilize light from said projection end to produce a picture of the model, said display means including a concave screen and a convex mirror located to reflect light projected from said projection end onto said concave screen on which the picture is produced.

2. Visual simulation equipment as claimed in claim 1 in which said concave mirror and said concave screen are spherical.

3. Visual simulation equipment as claimed in claim 2 in which the respective convex mirrors of said input means and display means are spherical.

4. Visual simulation equipment as claimed in claim 2 in which the receiving and projection ends of the light transmission means are aligned with the respective convex mirrors on respective radii of the respective spheres of which said concave mirror and said concave screen are a part.

5. Visual simulation equipment as claimed in claim 3 in which the convex mirror of said input means is mounted adjacent the centre of the sphere of which the concave mirror of the input means forms a part; and the convex mirror of said display means is mounted adjacent the centre of the sphere of which the concave screen of said display means forms a part.

6. Visual simulation equipment as claimed in claim 4 in which said concave mirror and said concave screen are each quarter-spherical.

7. Visual simulation equipment as claimed in claim 4 in which said concave mirror and said concave screen are each hemispherical.

8. Visual simulation equipment as claimed in claim 1 in which said light transmission means comprises a television camera at the receiving end; a television projector set at the projection end and means interconnecting said camera and said projector set to transmit television signals from the former to the latter.

9. Visual simulation equipment as claimed in claim 8 in which the concave and convex mirrors of said input means are mounted on said television camera to move therewith.

10. Visual simulation equipment according to claim 1 in which said concave mirror of the input means is spherical and is apertured; said convex mirror of the input means is spherical and is mounted adjacent the centre of the sphere of which said concave mirror forms a part and facing said concave mirror to reflect light gathered by said concave mirror to the aperture; said receiving end comprises a television camera aligned with said aperture and the convex mirror of the input means to receive light reflected to the aperture; said concave screen of the display means is spherical; the convex mirror of the display means is spherical and is mounted adjacent the centre of the sphere of which said screen forms a part and facing said screen; and said projection end comprises a television projector set located between said screen and the associated convex mirror to project light onto the latter for reflection onto the screen.

References Cited

UNITED STATES PATENTS

| | | | |
|---|---|---|---|
| 2,299,682 | 10/1942 | Conant. | |
| 2,703,506 | 3/1955 | Kelly | 178—7.88 X |
| 2,883,763 | 4/1959 | Schaper | 35—12 |
| 2,989,643 | 6/1961 | Scanlon | 178—6.8 X |

EUGENE R. CAPOZIO, *Primary Examiner.*

R. W. WEIG, *Assistant Examiner.*